United States Patent
Ponsada

(10) Patent No.: US 9,423,776 B2
(45) Date of Patent: Aug. 23, 2016

(54) METHOD FOR MANAGING AN OPERATION FOR A WATCH HAVING A DIGITAL DISPLAY TO EXIT STANDBY MODE

(75) Inventor: Thomas Ponsada, Puteaux (FR)

(73) Assignee: TIME2EGO, Enghien les Bains (FR)

( * ) Notice: Subject to any disclaimer, the term of this patent is extended or adjusted under 35 U.S.C. 154(b) by 205 days.

(21) Appl. No.: 14/235,738

(22) PCT Filed: Jul. 11, 2012

(86) PCT No.: PCT/EP2012/063578
§ 371 (c)(1),
(2), (4) Date: Mar. 14, 2014

(87) PCT Pub. No.: WO2013/017384
PCT Pub. Date: Feb. 7, 2013

(65) Prior Publication Data
US 2014/0269225 A1    Sep. 18, 2014

(30) Foreign Application Priority Data
Jul. 29, 2011  (FR) ...................................... 11 57002

(51) Int. Cl.
*G06F 1/00* (2006.01)
*G06F 1/26* (2006.01)
*G06F 1/32* (2006.01)
(Continued)

(52) U.S. Cl.
CPC ................ *G04G 19/12* (2013.01); *G04C 3/002* (2013.01); *G06F 1/3206* (2013.01)

(58) Field of Classification Search
CPC .............................. G04G 19/12; G06F 1/3206
USPC ......................................... 713/300, 320, 324
See application file for complete search history.

(56) References Cited

U.S. PATENT DOCUMENTS

| | | | |
|---|---|---|---|
| 3,939,640 | A | 2/1976 | Kahn |
| 4,036,007 | A | 7/1977 | Shelley |
| 5,886,954 | A | 3/1999 | Asami et al. |
| 6,975,959 | B2 | 12/2005 | Dietrich et al. |

(Continued)

FOREIGN PATENT DOCUMENTS

| | | |
|---|---|---|
| EP | 0 691 597 | 1/1996 |
| EP | 1 273 983 | 1/2003 |
| EP | 1 752 841 | 2/2007 |

OTHER PUBLICATIONS

Tanenbaum, Structured Computer Organization, 1984, Prentice-Hall, Second Edition, pp. 10-12.*

(Continued)

*Primary Examiner* — Mark Connolly
(74) *Attorney, Agent, or Firm* — Pillsbury Winthrop Shaw Pittman LLP

(57) ABSTRACT

A method for managing an operation for a watch to exit standby mode, the watch being provided with a dial having a digital display, and placed into a standby mode, in which the dial is off, includes storing, in a memory of the watch, an algorithm for detecting a transition sequence, the algorithm parameterized from a set of predetermined, fixed data indicative of a transition sequence; acquiring a set of variable data using a sensor including an accelerometer for measuring variable data on the acceleration of the watch in three directions, and/or a gyroscope for measuring variable data on the position of the watch in three directions; processing the variable data using the algorithm to obtain a concordance value of the set of processed variable data; and, if the resulting concordance value is higher than a threshold, triggering the exit of the dial having the digital display from standby mode.

14 Claims, 1 Drawing Sheet

(51) Int. Cl.
  *G04G 19/12*   (2006.01)
  *G04C 3/00*    (2006.01)

(56) References Cited

U.S. PATENT DOCUMENTS

| | | | | |
|---|---|---|---|---|
| 7,260,732 | B1* | 8/2007 | Bittner, Jr. | G06F 1/26 |
| | | | | 713/300 |
| 8,230,246 | B1* | 7/2012 | Sharkey | G06F 1/1626 |
| | | | | 345/158 |
| 8,760,392 | B2 | 6/2014 | Lloyd et al. | |
| 8,872,646 | B2 | 10/2014 | Kahn et al. | |
| 2005/0231454 | A1* | 10/2005 | Alben | G09G 3/2092 |
| | | | | 345/87 |
| 2012/0092822 | A1* | 4/2012 | Mooring | G04G 17/04 |
| | | | | 361/679.21 |

OTHER PUBLICATIONS

International Search Report as issued for International Application No. PCT/EP2012/063578, dated Oct. 10, 2012.

* cited by examiner

METHOD FOR MANAGING AN OPERATION FOR A WATCH HAVING A DIGITAL DISPLAY TO EXIT STANDBY MODE

CROSS REFERENCE TO RELATED APPLICATIONS

This application is the U.S. National Stage of PCT/EP2012/063578, filed Jul. 11, 2012, which in turn claims priority to French Patent Application No. 1157002, filed Jul. 29, 2011, the entire contents of all applications are incorporated herein by reference in their entireties.

TECHNICAL FIELD OF THE INVENTION

The present invention relates to a method for managing an operation for a watch having a digital display to exit standby mode.

The field of the invention is, generally speaking, that of watches with digital display. Such watches have now existed for several decades. They most often call upon a regulating instrument, the function of which is to dispense a regular time unit necessary for the indication of the time and the date, of quartz oscillator type; the latter is associated with an electronic circuit displaying the time in digital form. The quartz oscillator is usually supplied by a battery, which has to be replaced by a new one when the battery used has run out, wherein the batteries the most often used are of the silver oxide battery or lithium battery type.

Until now, the digital displays proposed by this type of watch have remained basic, most often merely indicating time information in the form of digital numerals or digital hands, potentially different information items being added thereto, also in digital form (date, time zone, etc.).

TECHNOLOGICAL BACKGROUND OF THE INVENTION

The watches concerned by the invention are watches in which the complete dial is constituted of a dial of LCD screen type, advantageously in colour and having high definition, thus making it possible in particular to present three-dimensional images. It thus involves proposing, on a watch, an elaborate digital display. The three-dimensional images are advantageously realistic, calculated in real time by a main processor of the watch considered.

For this type of watch, it is necessary to find a compromise between the size of the different electronic components involved in the operation of the watch, the necessary calculation performance and the autonomy of the watch.

Thus, the electrical consumption linked to rendering calculations is a sensitive element, the battery, or rechargeable battery, used having to be of limited size, while being heavily drawn on, particularly for the elaborate rendering of realistic three-dimensional images. It is thus necessary to find a solution to limit the energy consumption of the watch considered, on penalty of seeing its operating life autonomy considerably limited.

GENERAL DESCRIPTION OF THE INVENTION

The subject matter of the invention offers a solution to the problem that has been described above by proposing a solution for limiting the energy consumption of the watch considered, while assuring comfort of use for the wearer of the watch. To this end, it is proposed in the invention to place the watch by default in a standby mode, from which it only exits in particular conditions of use, the exit from standby mode taking place automatically, without intervention of the user.

The invention thus essentially relates to a method for managing an operation for a watch to exit standby mode, said watch being provided with a dial having a digital display, and being placed into a standby mode, in which the dial is off, wherein said method is characterized in that it comprises the various steps of:

storing, in a memory module of the watch, at least one algorithm for detecting a transition sequence, said algorithm having been parameterized from a set of predetermined, fixed data indicative of a transition sequence;

acquiring a set of variable data using a sensor assembly, said sensor assembly including an accelerometer capable of measuring variable data on the acceleration of the watch in three directions, and/or a gyroscope capable of measuring variable data on the position of the watch in three directions;

processing the set of variable data using the algorithm for detecting a transition sequence in order to obtain a concordance value of the set of processed variable data;

if the resulting concordance value is higher than a predetermined threshold, triggering the exit of the dial having the digital display from standby mode.

Apart from the main characteristics that have been mentioned in the preceding paragraph, the method according to the invention may have one or more of the complementary characteristics among the following, considered individually or according to any technically possible combinations thereof:

the step of acquisition of variable data comprises the various operations of:

measuring a first group of variable data using the gyroscope and the accelerometer;

calculating a set of additional variation data from the first set of data to constitute a second group of variable data;

combining the data of the first group of variable data and the data of the second group of variable data to constitute the set of variable data;

the set of variable data is acquired over a predetermined duration, comprised between 0.15 seconds and 3 seconds, particularly 2 seconds;

the set of variable data is acquired by taking measures using the sensor assembly at a frequency comprised between ten and fifty hertz, particularly twenty hertz;

the set of variable data is acquired continuously using an intermediate processor, of dedicated DSP type, of the watch, said intermediate processor being maintained in an active state;

the step of exiting from standby of the dial with digital display is triggered following an exit from standby of a main processor of the watch, said countdown of the main processor being caused by the reception of a signal, particularly an interruption signal transmitted from the intermediate processor to the main processor, said signal being transmitted if the resulting concordance value is higher than a predetermined threshold;

the method comprises the additional step consisting in measuring, using a light sensor present on the watch, a luminosity information, the exit of the dial having the digital display from standby mode being conditioned to the presence of a minimum luminosity threshold;

each transition sequence is associated with an observed movement of the watch, said transition sequence depending on the fact that the watch is worn on a left wrist or the fact that the watch is worn on a right wrist.

The present invention also relates to a watch capable of implementing the method according to the invention.

BRIEF DESCRIPTION OF THE DRAWINGS

The figures are only given for indicative purposes and in no way limit the invention. The figures show.

DETAILED DESCRIPTION OF AT LEAST ONE EMBODIMENT OF THE INVENTION

Unless specified otherwise, a same element appearing in the different figures has a single reference.

Figure 1:
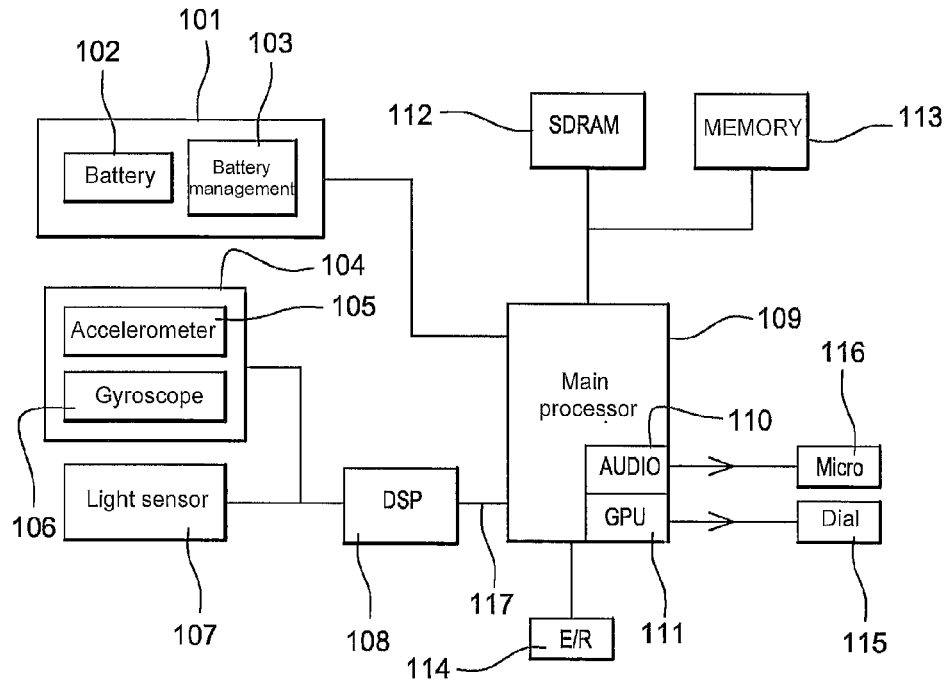
in FIG. 1, a schematic representation of an architecture of the different electronic components of a watch according to the invention.

FIG. 1 represents a set of electronic components capable of intervening in an example of implementation of the method according to the invention or, in a more general manner, in the operation of the watch capable of implementing the method according to the invention. Thus, in FIG. 1, are represented, as electronic components present in the watch, interconnected together by buses capable of conveying command signals and/or data:

- an energy consumption regulation unit 101, comprising a battery type element 102 and a module 103 for managing the use of the battery;
- a unit 104 for detecting movement of the watch, comprising particularly a gyroscope 105 and an accelerometer 106;
- a light sensor 107;
- an intermediate processor 108, of DSP processor type, receiving in input information items from the movement detection unit 104 of the watch and the light sensor 107;
- a main processor 109, the main function of which is to manage the complex digital display on a dial 115 of the watch and, more generally, the set of functionalities of the watch; to this end, the main processor comprises particularly a module 110 intended for the sound effects of the watch reproduced via a micro 116, and a module 111 of GPU type, which is a module specific to the restitution of graphic effects on the dial 115; the main processor 109 is connected to the intermediate processor using a link 117 through which can transit an interruption signal capable of making the main processor 109 exit from a standby mode in which it is found, the standby mode of the main processor 109 corresponding to an operating mode thereof in which a minimum quantity of energy is used, the display functions on the dial 115 not being for example active;
- different memory modules, particularly a SDRAM type memory 112 and a mass memory 113;
- a communication module 114, for example operating according to the Bluetooth protocol, comprising at least one reception module, and advantageously an emission module; such a module may be used for example for updating algorithms present within different processors of the watch, and/or for downloading new three-dimensional images to reproduce on the dial of the watch.

By default, the watch is placed in standby mode, in which the dial is not activated, no image, or at least no complex image, being displayed. In standby mode, the main processor is not active and is also placed in standby mode; the energy consumption regulation unit 101 then makes it possible to have minimum energy consumption of the watch.

Generally speaking, the standby mode of the watch is observed when it is in a position or transition in which it is considered that the dial 115 is not looked at by the user; it is in such a configuration, which is the most frequent configuration when a user wears a watch, that an energy saving is made by the watch according to the invention.

According to the invention, the exit from standby mode of the watch coincides with the detection of a transition sequence, corresponding to a sequence of movements and/or positions, said transition sequence reflecting the fact that the user wishes to look at the dial 115 of his watch. Thus, as will be detailed below, it is the identification of a characteristic movement undergone by the watch which triggers the exit from standby of the main processor, and thus the display of complex data (for example of three-dimensional image type) on the dial 115 of the watch. Such a characteristic movement is typically a brief movement which consists in turning the wrist to bring the dial 115 of the watch into the user's field of vision, bearing witness for example to the passage of the watch from a position in which the arm of the user is straight along the body, to a position in which the arm of the user is bent, with the wrist inclined so as to make the dial 115 of the watch visible.

In the method according to the invention, one thus proposes determining in real time, and continuously, in what instantaneous position said watch finds itself, while considering a history of previous positions and the movement that has made it possible to go to the instantaneous position considered. To this end, it is proposed, in the invention, to use a mathematical algorithm making it possible to define statistically whether observed movements of the watch correspond or not to a transition sequence requiring the exit of the watch from standby mode.

Figure 2:
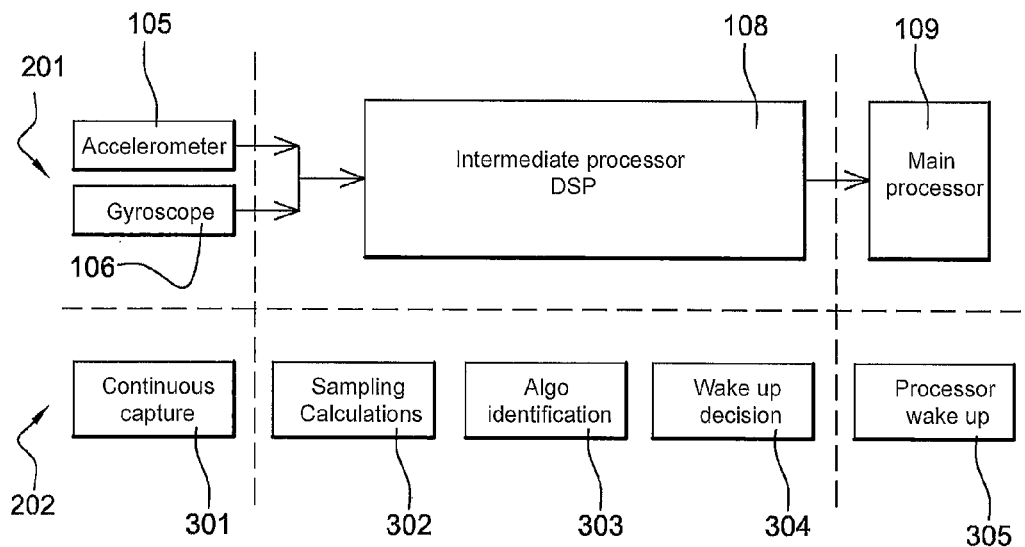
in FIG. 2, an illustration of an example of intervening events, to end up in an exit from standby mode of the watch according to the invention.

Such an operation is detailed with reference to FIG. 2, in which is represented, in the lower part 201, an example of the sequencing of the method according to the invention and, in the upper part 202, the different electronic components intervening with regard to the different phases of the method taking place in the lower part 201.

Thus, a first step of the represented example of implementation consists in an acquisition 301 of data using sensors of the watch, particularly the gyroscope 105 and/or the accelerometer 106. The acquisition of data is made in the form of a continuous capture of movements and/or accelerations of the watch, potentially completed by light intensity information items generated by the light sensor. The capture is made at a frequency comprised between 10 and 50 Hertz, typically 20 Hertz, which corresponds to a capture of data every 0.05 seconds.

The set of these data are communicated to the intermediate processor 108 of dedicated DSP type; this consists essentially of three separate operations:

- an operation 302 known as sampling and calculating of values to interpret;
- an operation 303 known as identification of a transition sequence, a transition sequence corresponding to a set of movements observed at the level of the watch that make it possible to conclude that the watch is in consultation position (the user having manifested his intention of consulting it), and that the display on the dial must be made;
- an operation 304 known as decision to wake up the main processor.

When the decision to wake up the main processor is taken, an interruption signal is generated from the intermediate processor to the main processor to exit it from its standby mode during an operation 305.

The operations 302, 303 and 304 are now detailed in an example of implementation of the method according to the invention:

The operation 302 aims to determine and/or to calculate variable data that are intended to be supplied to an algorithm for detecting a transition sequence; these data are either raw data supplied by the different sensors of the watch, or data calculated from these raw data. Certain values are only calculated in an intermediate manner—one then speaks of pre-calculations—, they will not be present in the set of variable data actually used by the algorithm.

As an example, a group of variable data calculated from data supplied by the accelerometer 106 is given below.

The following definitions are defined beforehand:
- X is taken to mean acceleration on the X axis, either its current value or the data vector
- Y is taken to mean acceleration on the Y axis, either its current value or the data vector
- Z is taken to mean acceleration on the Z axis, either its current value or the data vector
- $X\_t$ will designate the value at the instant t of the value X.

The reference instant taken for 0 is the moment considered (the instant where it is wished to determine if the user consults his watch. Hereafter, the data samples are numbered as a function of their distance with respect to this instant, for example $X\_2$ will designate the acceleration on X two samplings before the current sampling (the sampling period being for example 0.05 sec, the time difference observed corresponds to 0.1 sec).

For the calculated values, the following definitions are considered:

Additive aggregations

Four additive aggregations are used:
- AGR-XY: $(X+Y)/2$
- AGR-YZ: $(Y+Z)/2$
- AGR-ZX: $(Z+X)/2$
- AGR-XYZ: $(X+Y+Z)/3$ One notes that the resulting value is divided by the number of added values so as to keep a common order of magnitude.

Discrete derivatives

First derivatives

One calculates the first derivatives on the raw samples and the additive aggregations. For X, for example, one will calculate: $d\text{-}X\_0$ thus:

$$d\text{-}X\_0 = X\_0 - X\_1$$

Second derivatives

One calculates the second derivatives on the raw samples and the additive aggregations. For X, for example, one will calculate: $d2\text{-}X\_0$ thus:

$$d2\text{-}X\_0 = d\text{-}X\_0 - d\text{-}X\_1$$

Which is equivalent to:

$$d2\text{-}X\_0 = (X\_0 - X\_1) - (X\_1 - X\_2)$$

Moving averages

So as to smooth out the variations of the different measures the moving average.

Standard moving average

The standard moving average, SMA, is calculated for all the acceleration values, the aggregations and the derivatives.

This average is calculated over a period, the SMA5, SMA20 and SMA40 average values are calculated in this example, moving standards over a quarter of a second, one second and two seconds.

$$\text{SMA20-}X\_0 = (\text{SMA20-}X\_0 + \text{SMA20-}X\_1 + \ldots + \text{SMA20-}X\_18 + \text{SMA20-}X\_19)/20$$

Exponential moving average

The exponential moving average, EMA, is calculated for all the acceleration values, the aggregations and the derivatives.

This average is calculated according to a coefficient a, which we will take at 0.2 and 0.35.

$$\text{EMA0.2-}X\_0 = X\_0 * 0.2 + (1 - 0.2) * \text{EMA0.2-}X\_1$$

RSI

The RSI will be calculated for each acceleration and each aggregation in a similar manner.

It is calculated over a period as the ratio, known as the RS ratio, of the average of rising movements divided by the average of descending movements put in the form of an index as follows.

$$\text{RSI} = 100 - (100(1+\text{RS}))$$

The RSI is calculated on 9, 14 and 21 intervals for each acceleration.

Standard deviation

The standard deviation is calculated on the same samples as the averages and over the same periods, as follows:

$$\text{STDDEV5-}X\_0 = \text{SQRT}((\text{SMA5-}X\_0 - X\_0)^2/5 + (\text{SMA5-}X\_1 - X\_1)^2/5 + \ldots + (\text{SMA5-}X\_4 - X\_4)^2/5)$$

Where SQRT designates the square root.

One thus obtains the following data group, at each sampling instant, composed of 203 attributes:
- X
- Y
- AGR-XY
- AGR-YZ
- AGR-ZX
- AGR-XYZ
- d-X
- d-Y
- d-Z
- d-AGR-XY
- d-AGR-YZ
- d-AGR-ZX
- d-AGR-XYZ
- d2-X
- d2-Y
- d2-Z
- d2-AGR-XY
- d2-AGR-YZ
- d2-AGR-ZX
- d2-AGR-XYZ
- SMA5-X
- SMA5-Y
- SMA5-Z
- SMA5-AGR-XY
- SMA5-AGR-YZ
- SMA5-AGR-ZX
- SMA5-AGR-XYZ
- SMA5-d-X
- SMA5-d-Y
- SMA5-d-Z
- SMA5-d-AGR-XY
- SMA5-d-AGR-YZ
- SMA5-d-AGR-ZX
- SMA5-d-AGR-XYZ SMA5-d2-X
SMA5-d2-Y
SMA5-d2-Z
SMA5-d2-AGR-XY
SMA5-d2-AGR-YZ
SMA5-d2-AGR-ZX
SMA5-d2-AGR-XYZ
SMA20-X
SMA20-Y
SMA20-Z
SMA20-AGR-XY
SMA20-AGR-YZ
SMA20-AGR-ZX
SMA20-AGR-XYZ
SMA20-d-X
SMA20-d-Y
SMA20-d-Z
SMA20-d-AGR-XY
SMA20-d-AGR-YZ
SMA20-d-AGR-ZX
SMA20-d-AGR-XYZ
SMA20-d2-X
SMA20-d2-Y
SMA20-d2-Z
SMA20-d2-AGR-XY
SMA20-d2-AGR-YZ
SMA20-d2-AGR-ZX
SMA20-d2-AGR-XYZ
SMA40-X
SMA40-Y
SMA40-Z
SMA40-AGR-XY
SMA40-AGR-YZ
SMA40-AGR-ZX
SMA40-AGR-XYZ
SMA40-d-X
SMA40-d-Y
SMA40-d-Z
SMA40-d-AGR-XY
SMA40-d-AGR-YZ
SMA40-d-AGR-ZX
SMA40-d-AGR-XYZ
SMA40-d2-X
SMA40-d2-Y
SMA40-d2-Z
SMA40-d2-AGR-XY
SMA40-d2-AGR-YZ
SMA40-d2-AGR-ZX
SMA40-d2-AGR-XYZ
EMA0.2-X
EMA0.2-Y
EMA0.2-Z
EMA0.2-AGR-XY
EMA0.2-AGR-YZ
EMA0.2-AGR-ZX
EMA0.2-AGR-XYZ
EMA0.2-d-X
EMA0.2-d-Y
EMA0.2-d-Z
EMA0.2-d-AGR-XY
EMA0.2-d-AGR-YZ
EMA0.2-d-AGR-ZX
EMA0.2-d-AGR-XYZ
EMA0.2-d2-X
EMA0.2-d2-Y
EMA0.2-d2-Z
EMA0.2-d2-AGR-XY
EMA0.2-d2-AGR-YZ
EMA0.2-d2-AGR-ZX
EMA0.2-d2-AGR-XYZ
EMA0.35-X
EMA0.35-Y
EMA0.35-Z
EMA0.35-AGR-XY
EMA0.35-AGR-YZ
EMA0.35-AGR-ZX
EMA0.35-AGR-XYZ
EMA0.35-d-X
EMA0.35-d-Y
EMA0.35-d-Z
EMA0.35-d-AGR-XY
EMA0.35-d-AGR-YZ
EMA0.35-d-AGR-ZX
EMA0.35-d-AGR-XYZ
EMA0.35-d2-X
EMA0.35-d2-Y
EMA0.35-d2-Z
EMA0.35-d2-AGR-XY
EMA0.35-d2-AGR-YZ
EMA0.35-d2-AGR-ZX
EMA0.35-d2-AGR-XYZ
RSI9-X
RSI9-Y
RSI9-Z
RSI9-AGR-XY
RSI9-AGR-YZ
RSI9-AGR-ZX
RSI9-AGR-XYZ
RSI14-X
RSI14-Y
RSI14-Z
RSI14-AGR-XY
RSI14-AGR-YZ
RSI14-AGR-ZX
RSI14-AGR-XYZ
RSI21-X
RSI21-Y
RSI21-Z
RSI21-AGR-XY
RSI21-AGR-YZ
RSI21-AGR-ZX
RSI21-AGR-XYZ
STDDEV5-X
STDDEV5-Y
STDDEV5-Z
STDDEV5-AGR-XY
STDDEV5-AGR-YZ
STDDEV5-AGR-ZX
STDDEV5-AGR-XYZ
STDDEV5-d-X
STDDEV5-d-Y
STDDEV5-d-Z
STDDEV5-d-AGR-XY
STDDEV5-d-AGR-YZ
STDDEV5-d-AGR-ZX
STDDEV5-d-AGR-XYZ
STDDEV5-d2-X
STDDEV5-d2-Y
STDDEV5-d2-Z
STDDEV5-d2-AGR-XY
STDDEV5-d2-AGR-YZ
STDDEV5-d2-AGR-ZX
STDDEV5-d2-AGR-XYZ
STDDEV20-X STDDEV20-Y
STDDEV20-Z
STDDEV20-AGR-XY
STDDEV20-AGR-YZ
STDDEV20-AGR-ZX
STDDEV20-AGR-XYZ
STDDEV20-d-X
STDDEV20-d-Y
STDDEV20-d-Z
STDDEV20-d-AGR-XY
STDDEV20-d-AGR-YZ
STDDEV20-d-AGR-ZX
STDDEV20-d-AGR-XYZ
STDDEV20-d2-X
STDDEV20-d2-Y
STDDEV20-d2-Z
STDDEV20-d2-AGR-XY
STDDEV20-d2-AGR-YZ
STDDEV20-d2-AGR-ZX
STDDEV20-d2-AGR-XYZ
STDDEV40-X
STDDEV40-Y
STDDEV40-Z
STDDEV40-AGR-XY
STDDEV40-AGR-YZ
STDDEV40-AGR-ZX
STDDEV40-AGR-XYZ
STDDEV40-d-X
STDDEV40-d-Y
STDDEV40-d-Z
STDDEV40-d-AGR-XY
STDDEV40-d-AGR-YZ
STDDEV40-d-AGR-ZX
STDDEV40-d-AGR-XYZ
STDDEV40-d2-X
STDDEV40-d2-Y
STDDEV40-d2-Z
STDDEV40-d2-AGR-XY
STDDEV40-d2-AGR-YZ
STDDEV40-d2-AGR-ZX
STDDEV40-d2-AGR-XYZ The moving averages are stored in the form of difference with a reference element, for example the attribute EMA0.2-d-AGR-XYZ is not stored as such, but is stored in the form $$EMA0.2\text{-}d\text{-}AGR\text{-}XYZ\text{-}d\text{-}AGR\text{-}XYZ.$$

In an advantageous example of implementation, only the following values are used by the algorithm for detecting a transition sequence: STDDEV40-Y, STDDEV20-Y, RSI21-AGR-YZ, STDDEV40-d2-X and SMA40-AGR-YZ.

The so-called identification of a transition sequence operation 303 consists in communicating the data calculated in the operation 303 to the algorithm for detecting a transition sequence.

The data detection algorithm is an algorithm for which one has determined a certain number of parameters during a prior learning phase, involving a learning base. The latter is constituted of a set of examples of instances for which the values of classes are known, in other words for which one knows if the user was looking or not at the watch at the moment where one has measured and/or calculated the instances considered.

The learning phase has, conventionally, the objective of adapting a decision model to the algorithm so as to classify as best as possible the input data that is supplied to it.

Different varieties of decision models exist which may be used in the context of the invention; one finds for example:
Decision trees (an algorithm of ID3 type may then be used)
Neuron networks
Logistic regressions; the regression algorithms used are then advantageously boosted. The object of the so-called boosting operation is not to use a single but several in order then to be able to aggregate the result and to have better detection reliability.

The operation 303 then ends up, by the implementation of the algorithm having been the subject of a learning phase, in a concordance value obtained from variable data processed by the algorithm.

The operation 304 of deciding to wake up the main processor consists in generating an interruption signal from the intermediate processor 108 to the main processor 109 when the concordance value is higher than a predetermined threshold.

Thus, in the method according to the invention, only the intermediate processor is permanently active; this consuming little energy, and the wake up of the main processor, which consumes a lot of energy, only being ordered when a transition sequence has been detected, the savings in energy consumption terms are consequent.

Advantageously, the main processor is returned to a standby mode in a relatively rapid manner, either after the end of a countdown, for example of ten seconds, which will have started when the main processor has exited from standby, i.e. during the detection of a reverse transition sequence corresponding to the return of the watch to a rest position, in other words a position in which the user no longer consults it.

In order to limit erroneous exits from standby mode, advantageously one provides for using the information items supplied by the light sensor: thus, even if a transition sequence seems to have been detected, an insufficient light at a considered instant is interpretable by the transition sequence detection algorithm as an indication according to which the user is not trying to consult the dial of the watch, it remaining for example beneath the shirt of the user; the exit from standby is then not observed.

The invention claimed is:
1. A method for managing an operation for a watch to exit standby mode, said watch being provided with a dial having a digital display, and being placed into a standby mode in which the dial is off, said method comprising:
storing, in a memory module of the watch, at least one algorithm for detecting a transition sequence, said algorithm having been parameterized from a set of predetermined, fixed data indicative of a transition sequence;
acquiring a set of variable data using a sensor assembly, said sensor assembly including an accelerometer capable of measuring variable data on the acceleration of the watch in three directions, and a gyroscope capable of measuring variable data on the position of the watch in three directions;
processing the set of variable data using the algorithm for detecting a transition sequence in order to obtain a concordance value of the set of processed variable data;
if the resulting concordance value is higher than a predetermined threshold, triggering the exit of the dial having the digital display from standby mode,
wherein the algorithm has been subject to a learning phase to adapt a decision model to the algorithm.
2. The method according to claim 1, wherein the set of variable data is acquired over a predetermined duration, comprised between 0.15 seconds and 3 seconds.

3. The method according to claim 2, wherein the predetermined duration is 2 seconds.

4. The method according to claim 1, wherein the set of variable data is acquired by taking measures using the sensor assembly at a frequency comprised between ten and fifty hertz.

5. The method according to claim 4, wherein the frequency is twenty hertz.

6. The method according to claim 1, wherein the set of variable data is acquired continuously using an intermediate processor, of dedicated DSP type, of the watch, said intermediate processor being maintained in an active state.

7. The method according to claim 6, wherein exiting from standby of the dial with digital display is triggered following an exit from standby of a main processor of the watch, said exit from standby of the main processor being triggered by the reception of a signal, wherein said signal is transmitted if the resulting concordance value is higher than a predetermined threshold.

8. The method according to claim 7, wherein said exit from standby of the main processor is triggered by an interruption signal transmitted from the intermediate processor to the main processor.

9. The method according to claim 1, comprising measuring, using a light sensor present on the watch, a luminosity information, wherein the exit of the dial having the digital display from standby mode is conditioned to the presence of a minimal luminosity threshold.

10. A watch capable of implementing the method according to claim 1.

11. The method according to claim 1, wherein the decision model is based upon a decision tree, a neuron network or a logistic regression.

12. The method according to claim 1, wherein the transition sequence is associated with an observed movement of the watch.

13. A method for managing an operation for a watch to exit standby mode, said watch being provided with a dial having a digital display, and being placed into a standby mode in which the dial is off, said method comprising:
    storing, in a memory module of the watch, at least one algorithm for detecting a transition sequence, said algorithm having been parameterized from a set of predetermined, fixed data indicative of a transition sequence;
    acquiring a set of variable data using a sensor assembly, said sensor assembly including an accelerometer capable of measuring variable data on the acceleration of the watch in three directions, and a gyroscope capable of measuring variable data on the position of the watch in three directions;
    processing the set of variable data using the algorithm for detecting a transition sequence in order to obtain a concordance value of the set of processed variable data;
    if the resulting concordance value is higher than a predetermined threshold, triggering the exit of the dial having the digital display from standby mode,
    wherein the acquiring comprises:
    measuring a first group of variable data using the gyroscope and the accelerometer;
    calculating a set of additional variation data from the first group of variable data to constitute a second group of variable data;
    combining data from the first group of variable data and data from the second group of variable data to constitute the set of variable data.

14. A method for managing an operation for a watch to exit standby mode, said watch being provided with a dial having a digital display, and being placed into a standby mode in which the dial is off, said method comprising:
    storing, in a memory module of the watch, at least one algorithm for detecting a transition sequence, said algorithm having been parameterized from a set of predetermined, fixed data indicative of a transition sequence;
    acquiring a set of variable data using a sensor assembly, said sensor assembly including an accelerometer capable of measuring variable data on the acceleration of the watch in three directions, and a gyroscope capable of measuring variable data on the position of the watch in three directions;
    processing the set of variable data using the algorithm for detecting a transition sequence in order to obtain a concordance value of the set of processed variable data;
    if the resulting concordance value is higher than a predetermined threshold, triggering the exit of the dial having the digital display from standby mode, and
    measuring, using a light sensor present on the watch, a luminosity information, wherein the exit of the dial having the digital display from standby mode is conditioned to the presence of a minimal luminosity threshold,
    wherein each transition sequence is associated with an observed movement of the watch, wherein first specific transition sequences are provided in a hypothesis where the watch is worn on a left wrist, and second specific transition sequences are provided in the hypothesis where the watch is worn on a right wrist.

* * * * *